J. GILBERT.
CORN PLANTER.
No. 73,797. Patented Jan. 28, 1868.
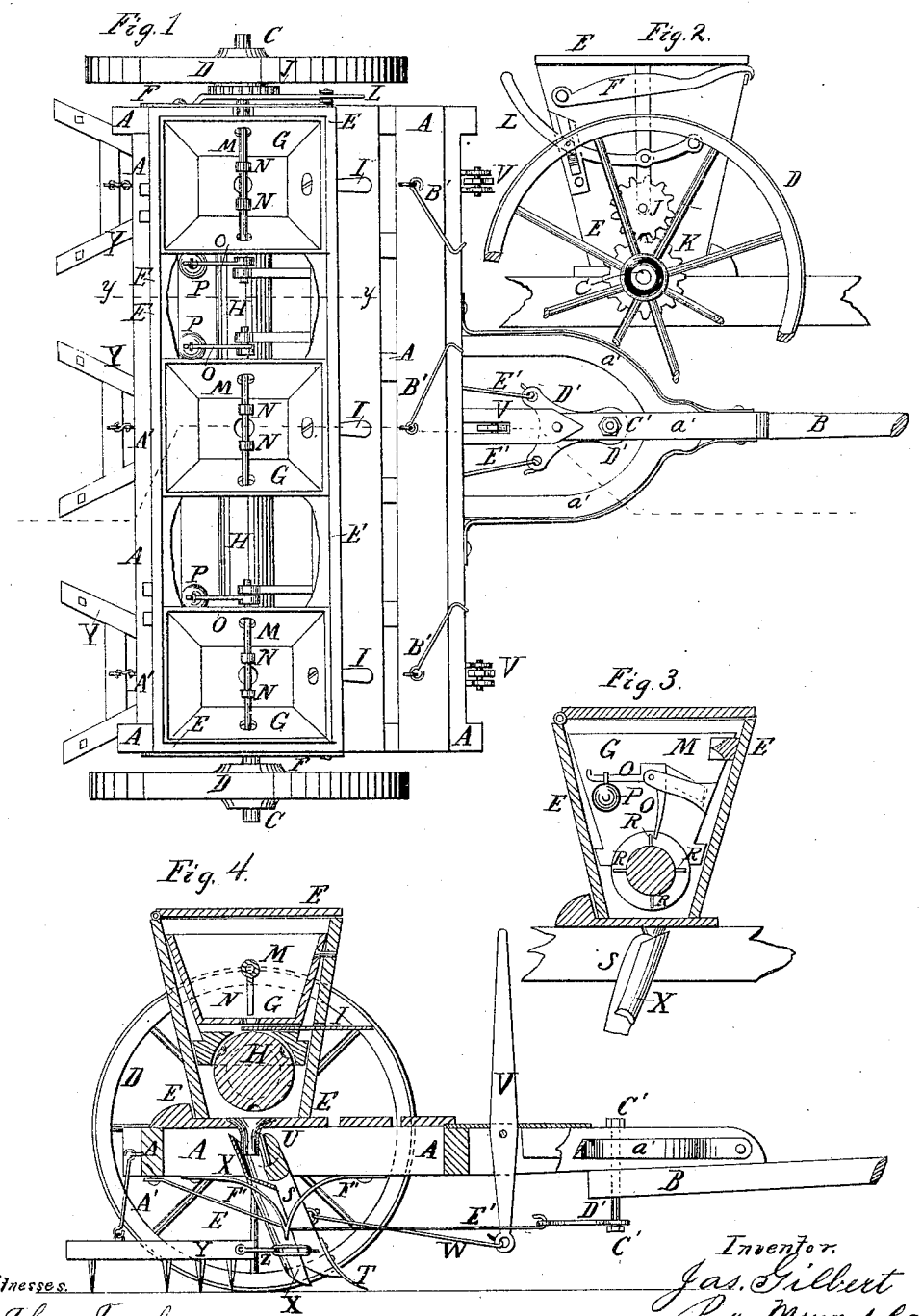

United States Patent Office.

JAMES GILBERT, OF WYALUSING, WISCONSIN.

Letters Patent No. 73,797, dated January 28, 1868.

IMPROVEMENT IN CORN-PLANTERS.

The Schedule referred to in these Letters Patent and making part of the same.

TO ALL WHOM IT MAY CONCERN:

Be it known that I, JAMES GILBERT, of Wyalusing, in the county of Grant, and State of Wisconsin, have invented a new and useful Improvement in Corn-Planter; and I do hereby declare that the following is a full, clear, and exact description thereof, which will enable those skilled in the art to make and use the same, reference being had to the accompanying drawings, forming part of this specification, in which—

Figure 1 is a top view of my improved corn-planter, the cover being removed.

Figure 2 is a detail end view of the same, parts being broken away.

Figure 3 is a detail sectional view of the same, taken through the line $y\ y$, fig. 1.

Figure 4 is a detail sectional view of the same, taken through the line $x\ x$, fig. 1.

Similar letters of reference indicate corresponding parts.

My invention has for its object to furnish an improved corn-planter, which shall be simple in construction, and effective, reliable, and accurate in operation; and it consists in the construction, combination, and arrangement of the various parts, as hereinafter more fully described.

A is the frame of the machine, to the forward side of which are attached the hounds $a'$, to which the tongue B is attached, and to the ends of which are attached the axles C, upon which the wheels D work. E is the box, which contains the dropping-devices, the bottom, front side, and ends of which are permanently attached to the frame A, but the rear side, to which the cover is hinged, is removable, being held in place by the hooks F. G are the seed-boxes or hoppers, the forward sides of which are secured to the forward side of the box E, and the bottoms of which fit and rest upon the dropping-cylinder H, which passes longitudinally through, and the ends of which rest and work in bearings in the ends of the box E. In the parts of the cylinder H, upon which the seed-boxes G rest, are formed holes or recesses, of such a size as to contain the desired amount of seed for each hill. The seed passes into the recesses of the cylinder H, through holes in the bottom of the seed-boxes G, and it is discharged from the cylinder H into hopper-shaped discharging-orifices in the bottom of the box E. The escape of the seed from the seed-boxes G is prevented, when desired, by sliding gates I, which work in slots in the bottoms of said seed-boxes, and the ends of which pass out through the front side of the box E, so that they may be conveniently operated by the driver. To one end of the cylinder H is attached a gear-wheel, J, the teeth of which mesh into the teeth of the gear-wheel K, attached to the inner end of the hub of one of the wheels D, so that the said cylinder H may be operated to drop the seed by the advance of the machine. L is a lever, one end of which is pivoted to the end of the box E, and which is connected with the cylinder H, as shown in fig. 2, so that by operating the said lever, the said cylinder H may be thrown into and out of gear with the wheel D, when desired. M are shafts passing through and working in holes in the sides of the seed-boxes G, and which have short downwardly-projecting arms or stirrers N attached to their middle parts, by the vibration of which the seed is agitated or stirred to prevent its clogging. To one end of the shafts M is attached an elbow-lever, O, one end of which projects downward and rests against a shoulder or projection of the support, to which the end of the shaft M is pivoted. The other arm of the elbow-lever O projects horizontally, and has a weight, P, suspended from its outer end. To the cylinder H, beneath the elbow-levers O, are attached projecting arms R, which, as the said cylinder revolves, strikes against the downwardly-projecting arms of the levers O, and raise them, the weights P bringing them back to their former position as soon as released from projections $R_1$, thus communicating a reciprocating or vibrating motion to the stirrers N. S are the plough-standards, to the lower ends of which the ploughs T are attached, and the upper ends of which are attached to rollers U, the journals of which revolve in bearings in the frame A of the machine. The lower parts of the standards S are connected with the lower ends of the levers V by the connecting-rods or chains W. The levers V are pivoted to the upper part of the forward side of the front cross-bar of the frame A, so that the draught-strain upon the ploughs may be sustained by the frame of the machine. The upper ends of the levers V project above the frame A, so that they may be easily reached and operated by the driver to raise the ploughs away from the ground when required. X are spouts or tubes attached to the rear side of the standards S, in such positions that when the plough-standards are in their working positions the said tubes or spouts may receive the seed and conduct it to the ground just in the rear of the ploughs T. Y are small V-shaped harrows, the forward ends of which are connected by short chains or jointed connecting-rods Z to the standards S. The harrows Y are still further sustained and kept in their proper relative positions while being operated, by the short chains or connecting-rods A', the lower ends of which are connected to the middle part of the harrows, and the upper ends of which are connected to the rear cross-bar of the frame A, as shown in fig. 4. By this construction the seed is partially covered by the inflow of the soil in the rear of the ploughs T. The harrows Y complete the covering and smooth off the surface of the ground. The levers V may be held in place when drawn back to raise the ploughs and harrows away from the ground by the hooks B', attached to the frame A, as shown in fig. 1. The tongue B is passed through a keeper upon the lower side of the hounds a', and is secured in place by the bolt C' passing down through the central bar of said hounds, and through the said tongue. The lower end of the bolt C' passes through a hole in the forward arm of the three-armed bar or plate D', to the end of the rearwardly-projecting arms of which are connected the forward ends of the draught-rods E', which pass back through the lower ends of the downwardly-projecting brackets or supports F', and the rear ends of which are secured to the rear part of the frame A. By this arrangement the line of draught is so much lowered that the downward strain is removed from the necks of the horses, enabling them to do their work with much greater ease and comfort.

I claim as new, and desire to secure by Letters Patent—

1. Connecting the plough-standards S to the frame A by means of the rollers U, substantially as herein shown and described, and for the purpose set forth.

2. The combination of the levers V and connecting-rods or chains W with the plough-standards S and frame A, for raising, lowering, and supporting said standards, substantially as herein shown and described.

3. The combination of the weighted elbow-lever O and shaft M, having arms or stirrers N attached to it, with the seed-box G, and with the projections R formed upon or attached to the dropping-cylinder H, substantially as herein shown and described, and for the purpose set forth.

4. The combination of the harrows Y with the plough-standards S and frame A, substantially as herein shown and described, and for the purpose set forth.

5. Applying the draught below the horizontal plane of the frame A, substantially as herein shown and described, and for the purpose set forth.

JAMES GILBERT.

Witnesses:
ROYAL CRANSTON,
J. H. JACCO.